(12) United States Patent
Miyoshi et al.

(10) Patent No.: US 6,902,426 B2
(45) Date of Patent: Jun. 7, 2005

(54) BICYCLE CROWN OR CROWN COVER WITH ELECTRICAL CONNECTOR SUPPORT

(75) Inventors: Hiroyuki Miyoshi, Osaka (JP); Masao Kojima, Osaka (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 10/444,729

(22) Filed: May 20, 2003

(65) Prior Publication Data

US 2004/0110405 A1 Jun. 10, 2004

Related U.S. Application Data

(62) Division of application No. 09/661,973, filed on Sep. 14, 2000, now Pat. No. 6,609,722.

(51) Int. Cl.⁷ .............................................. B62K 19/30
(52) U.S. Cl. .................................... 439/502; 439/573
(58) Field of Search .................... 439/573, 502, 439/34; 280/279, 280; 362/473, 474

(56) References Cited

U.S. PATENT DOCUMENTS

| 1,603,171 A | 10/1926 | Wade |
| 1,995,795 A | 3/1935 | Clark |
| 3,331,617 A | 7/1967 | Jacoby .................. 280/279 |
| 3,513,926 A | 5/1970 | Paget, Jr. |
| 3,831,979 A | 8/1974 | Baginski ................ 280/279 |
| 4,168,097 A | 9/1979 | Doll |
| 4,512,567 A | 4/1985 | Phillips .................. 272/73 |
| 5,222,752 A | 6/1993 | Hewitt ................ 280/288.4 |
| 5,562,297 A | 10/1996 | Lin ...................... 280/279 |
| 5,820,254 A | 10/1998 | Duenas .................. 362/473 |
| 5,848,799 A | 12/1998 | Huan ................... 280/276 |
| 6,104,099 A | 8/2000 | Mizuta et al. ............ 439/34 |
| 6,189,905 B1 | 2/2001 | Yelverton ............... 280/260 |
| 6,409,366 B1 | 6/2002 | Kondo ................... 362/473 |
| 6,600,411 B2 * | 7/2003 | Nishimoto ............... 340/432 |
| 6,609,722 B1 * | 8/2003 | Miyoshi et al. .......... 280/280 |

FOREIGN PATENT DOCUMENTS

| CH | 268 729 | 5/1950 |
| CH | 268 729 A | 5/1950 |
| DE | 419 506 C | 10/1925 |
| DE | 920 650 | 11/1954 |
| FR | 1 006 862 | 4/1925 |
| FR | 951.432 | 10/1949 |
| JP | 62-146787 | 6/1987 |
| JP | 06 115473 | 4/1994 |
| NL | 61 039 C | 12/1947 |
| NL | 61 039 | 12/1997 |

* cited by examiner

*Primary Examiner*—Neil Abrams
(74) *Attorney, Agent, or Firm*—Jeffer Mangels Butler & Marmaro, LLP

(57) ABSTRACT

A bicycle fork crown (10) or a fork crown cover (100) is disclosed having a connector holder (14, 114) with an inlet (18, 118) for receiving electrical cables (16a, 116a), and an outlet (20, 120) for receiving an electrical connector (22, 122). The connector holder (14, 114) retains the electrical connector (22, 122) and the electrical cables (16a, 16b) in a fixed position to facilitate installation and maintenance of the cables and the connection. The fork crown (10) or the fork crown cover (100) also includes a setting boss (12, 112) dimensioned to receive a connector cable terminal (28, 128). The connector cable terminal (28, 128) can be securely fastened to the setting boss (12, 112) by a fastening device (36, 136), such as a setting screw. In one embodiment of the invention, the fork crown (10) includes a rubber cover (150) that covers the terminal (28) and the electrical connector (22). In another embodiment of the invention, the fork crown cover (100) includes a pre-load adjuster cap (140). The fork crown cover (100) preferably has an upper crown cover (104) and a lower crown cover (102). The upper and lower crown covers (104, 102) can be attached together with any known fastening device.

2 Claims, 7 Drawing Sheets

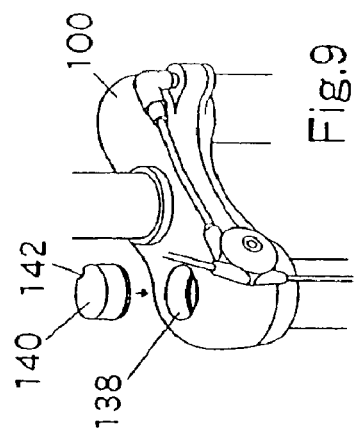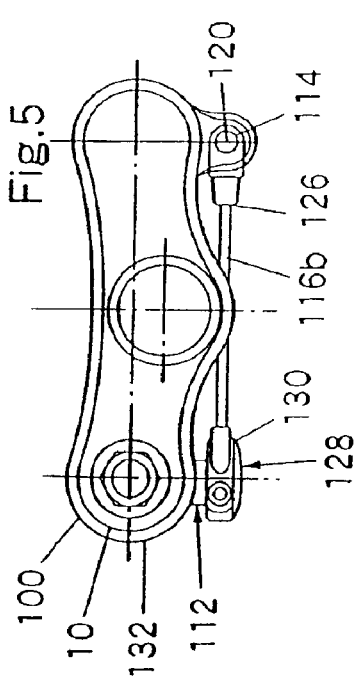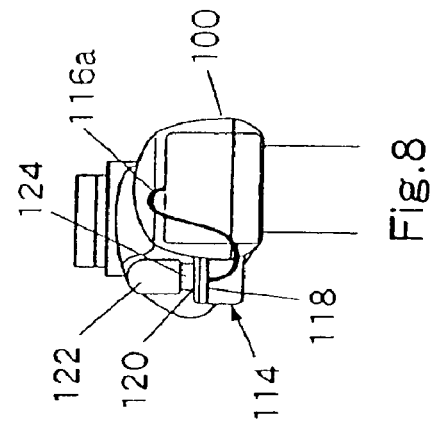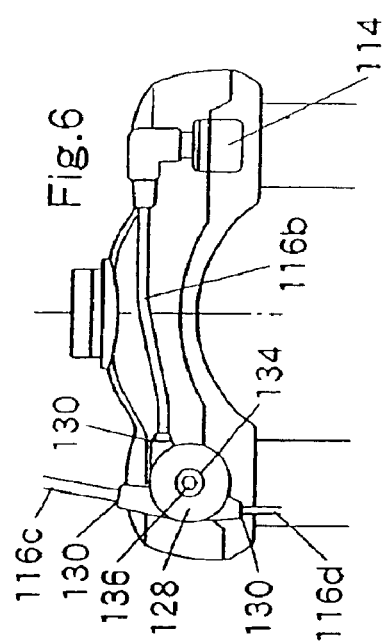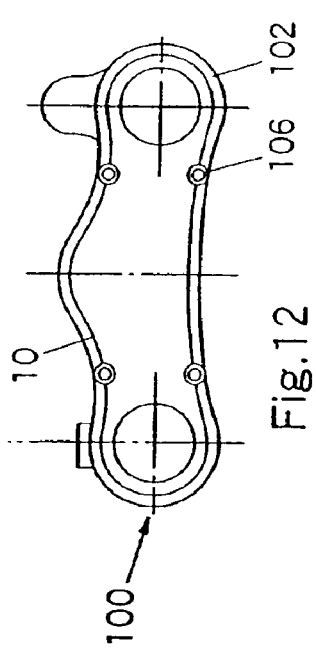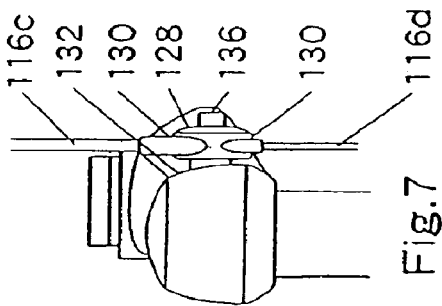

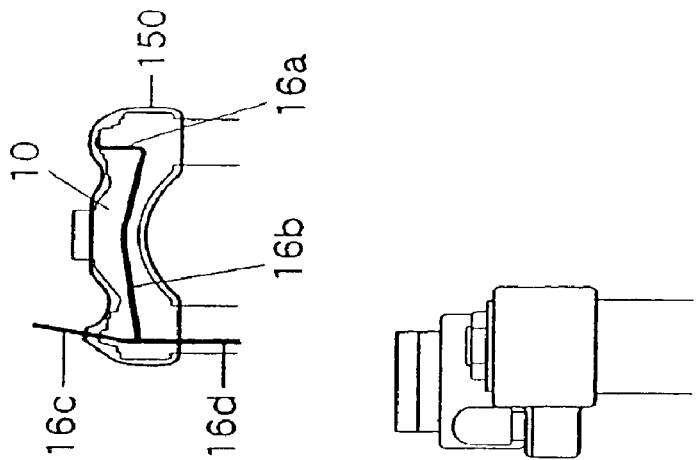
Fig.17
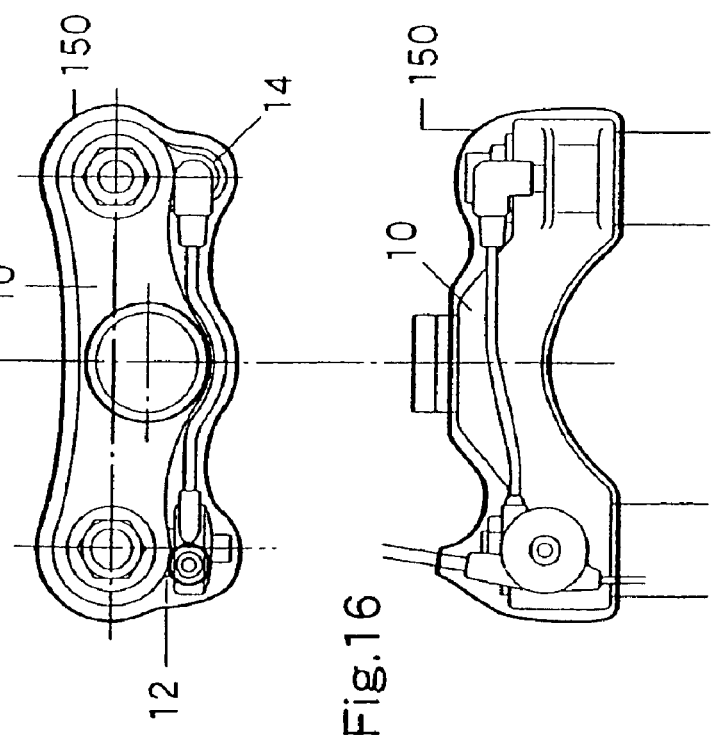
Fig.15
Fig.16
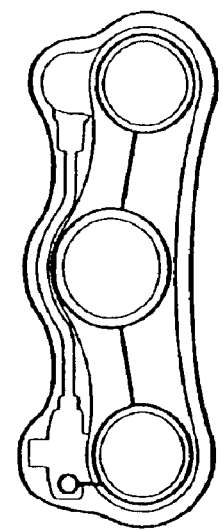
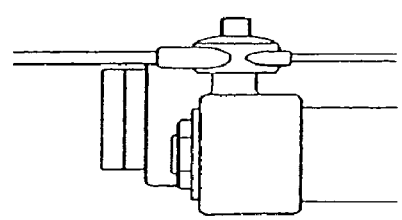

BICYCLE CROWN OR CROWN COVER WITH ELECTRICAL CONNECTOR SUPPORT

This application is a divisional of application Ser. No. 09/661,973, filed Sep. 14, 2000, now U.S. Pat. No. 6,609,722.

FIELD OF THE INVENTION

The present invention relates generally to a bicycle front suspension crown, and more particularly to a front suspension crown having a setting boss and a connector cable holder.

BACKGROUND OF THE INVENTION

Modern bicycles allow the rider to control the suspension, the gears, the brakes and other features of the bicycle to optimize the rider's experience. Much of the control functions are computerized so that a rider can control the particular function by simply pressing a switch on a control panel. A typical computerized control panel includes a base member mounted to the bicycle handlebar and numerous switches on the control panel, each switch corresponding to a particular function that is controllable by the rider. Electrical cables are necessary to transmit codes from the bicycle control panel to various motors and other equipment, such as the speed sensor, torque sensor, front suspension and rear suspension, to carry out the function desired by the rider.

In a technologically advanced bicycle, it is desirable to computerize the front suspension system to control the suspension character of the bicycle. An electrical suspension system, however, requires numerous cables to carry the codes to and from various motors and devices that control the suspension system. The existence of a multitude of cables to carry out the computerized functions of the bicycle can be cumbersome and unsightly. Accordingly, there is a need to provide a device that would manage the electrical cables of a bicycle and store the cables in a secure and organized manner.

Also, it is desirable to simplify the bicycle assembly process at the factory or at the bicycle dealer so that the cables are not inadvertently misconnected Furthermore, it is desirable to protect the cables from rain, dust or other element that could cause damage or wear to the electrical cables.

SUMMARY OF THE PREFERRED EMBODIMENTS

The present invention overcomes the aforementioned problems by providing a bicycle fork crown or a fork crown cover having a connector holder with an inlet for receiving electrical cables, and an outlet for receiving an electrical connector. The connector holder retains the electrical connector and the electrical cables in a fixed position to facilitate installation and maintenance of the cables and the connection. The fork crown or the fork crown cover also includes a setting boss dimensioned to receive a connector cable terminal. The connector cable terminal can be securely fastened to the setting boss by a fastening device, such as a setting screw. In one embodiment of the invention, the fork crown includes a rubber cover that covers the terminal and the electrical connector. In another embodiment of the invention, the fork crown cover includes a pre-load adjuster cap. The fork crown cover preferably has an upper crown cover and a lower crown cover. The upper and lower crown covers can be attached together with any known fastening device.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIG. 5 is a plan view of an embodiment of the present invention wherein the fork crown cover includes a setting boss and a connector holder thereon;

FIG. 6 is a front view of the embodiment of the fork crown cover of the present invention shown in FIG. 5;

FIG. 7 is a left side view of the embodiment of the fork crown cover of the present invention shown in FIG. 5;

FIG. 8 is a right side view of the embodiment of the fork crown cover of the present invention shown in FIG. 5;

FIG. 9 is an embodiment of the fork crown cover of the present invention having a cap for the pre-load adjuster;

FIG. 12 is a bottom view of an embodiment of the fork crown lower cover of the present invention set with a plurality of setting screws;

FIG. 15 is a top plan view of an embodiment of the fork crown of the present invention having a rubber cover thereon;

FIG. 16 is a front view of the embodiment of the fork crown of the present invention shown in FIG. 15; and FIG. 17 is a front view of an embodiment of the fork crown of the present invention having bare code with rough connection and a rubber cover thereon;

Like numerals refer to like parts throughout the several views of the drawings.

DETAILED DESCRIPTION OF THE PREFERRED EMBODIMENTS

Figure 1:
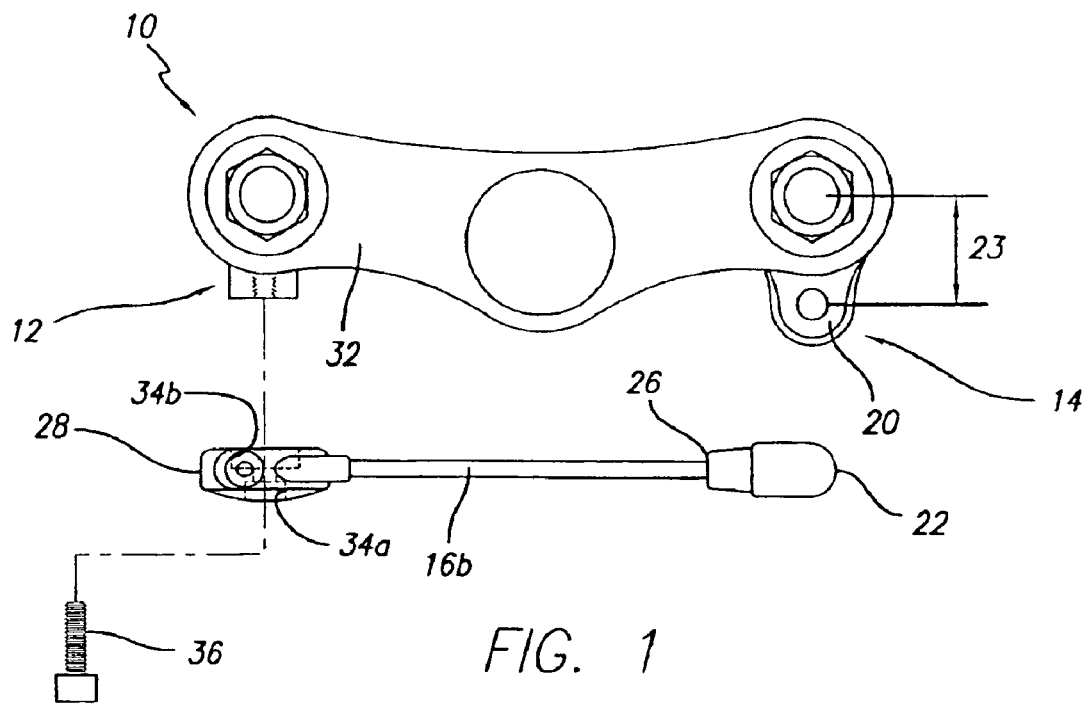
FIG. 1 is a plan view of an embodiment of the fork crown of the present invention wherein the connector, the connector cable terminal, and the setting screw are shown disconnected from the fork crown.

An exemplary embodiment of a bicycle crown fork according to the principles of the present invention is illustrated in FIGS. 1 through 4a and identified by reference numeral 10. As best shown in FIG. 1, fork crown 10 includes a setting boss 12 and a connector holder 14. The connector holder has a first portal, which is preferably an inlet 18, best shown in FIG. 4a, for receiving an electrical cable 16a and a second portal, which is preferably an outlet 20, best shown in FIG. 4a. The inlet 18 of the connector holder 14 is preferably dimensioned to securely receive electrical cables.

Figure 2:
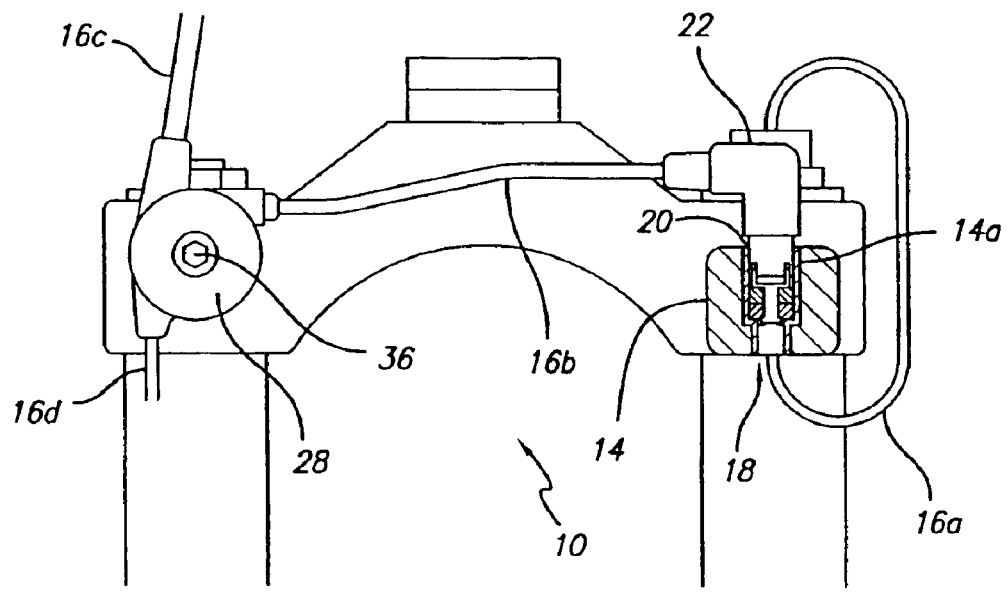
FIG. 2 is a front view of an embodiment of the fork crown of the present invention having a setting boss and a connector holder thereon.
Figure 3:
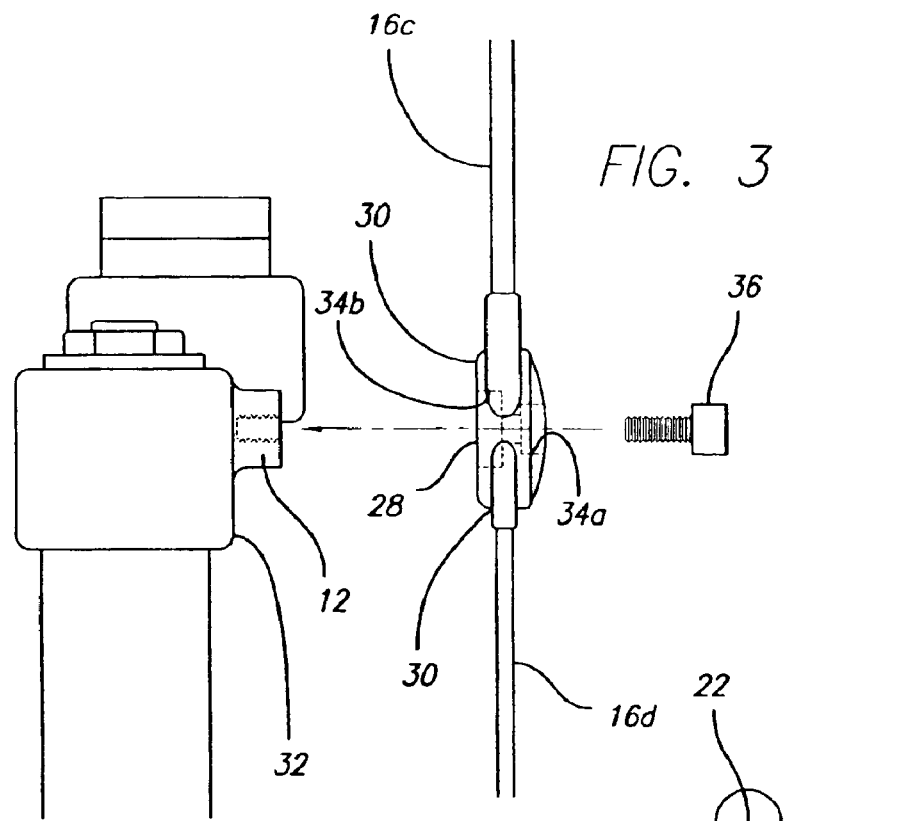
FIG. 3 is a left side view of the embodiment of the fork crown of the present invention shown in FIG. 2.
Figure 4:
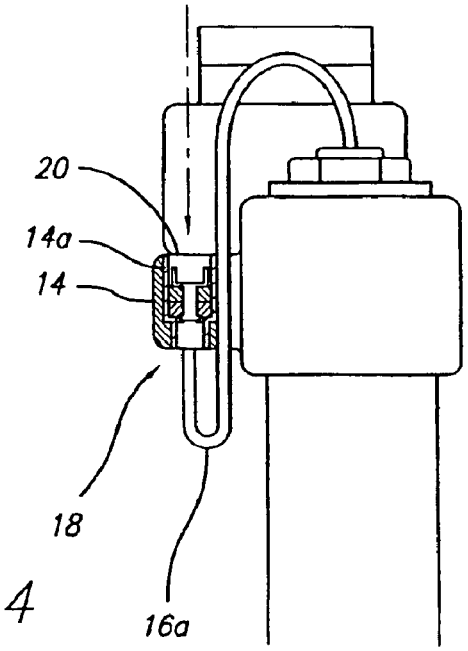
FIG. 4 is a right side view of the embodiment of the fork crown of the present invention shown in FIG. 2.
Figure 4A:
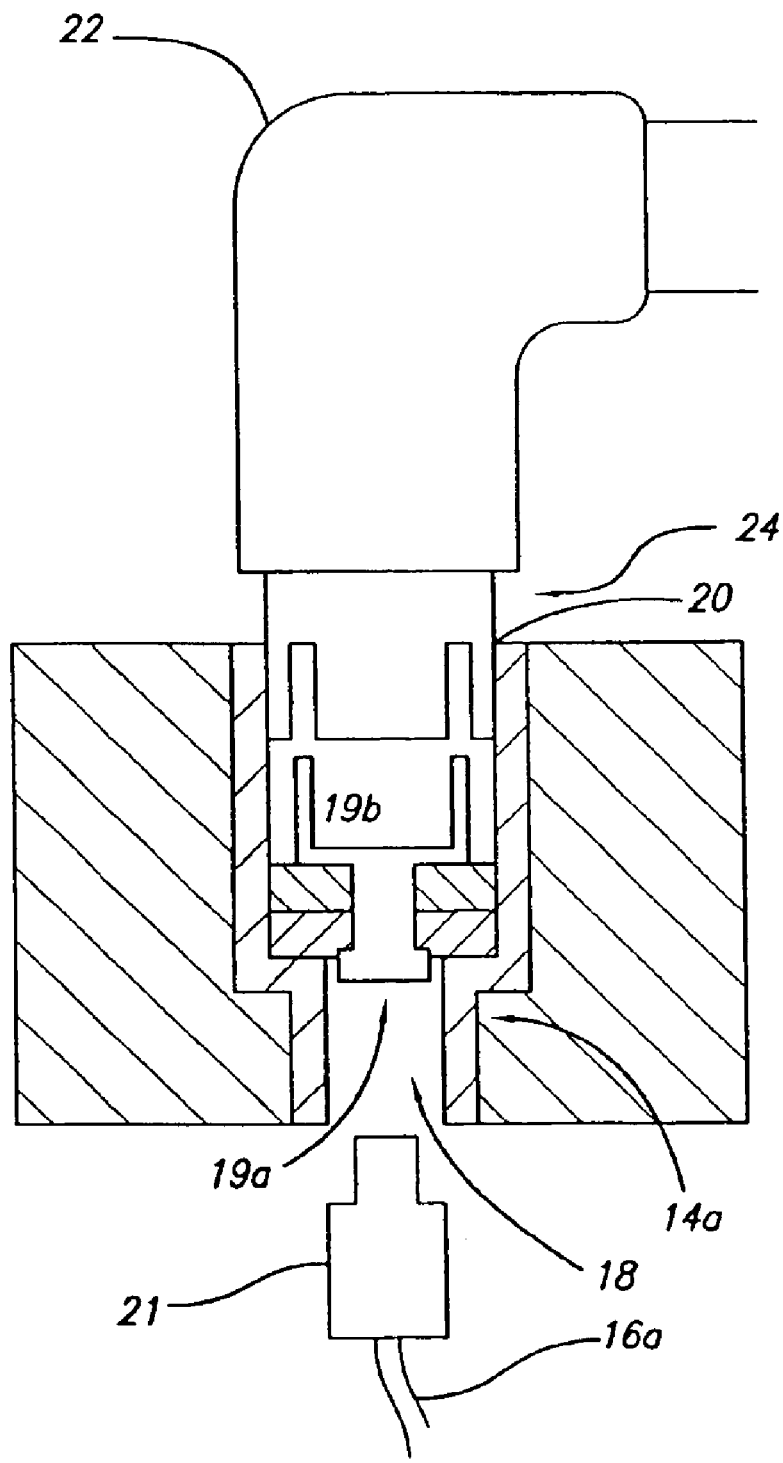
FIG. 4a is a depiction of a connector holder in accordance with the present invention.

As best shown in FIGS. 1–4a, in one embodiment of the invention, an electrical connector 22 is used to electrically connect cable 16a with another cable 16b. The electrical connector 22 preferably has a first end 24 attachable the outlet 20 of the connector holder 14 and a second end 26 dimensioned to receive electrical cable 16b. Connector 22 provides an electrical connection for cable 16a and 16b. As shown in FIG. 4a, first end 24 is adapted for making an electrical connection with electrode portion 19b and electrode 14a in connector holder 14. Plug 21 on cable 16a is adapted for making an electrical connection with electrode portion 19a and electrode 14a.

In the embodiment depicted in FIGS. 2 and 4, cable 16a is connected to a motor and transmits code to and from the motor. The invention, however, is not limited to cables that are connected to a particular motor or other electromechanical device. Rather, the invention can be utilized in any application wherein electrical cables are used.

As best shown in FIGS. 1 through 3, cable 16b is electrically connected to cables 16c and 16d via a connector cable terminal 28. Cable terminal 28 has various electrical ports 30 dimensioned to receive the electrical cables 16b, 16c and 16d. In the embodiment shown in FIGS. 1 through 3, the cable terminal 28 has three ports dimensioned to receive the three cables 16b, 16c, and 16d. In other embodiments of the invention, the connector cable terminal can have any number of ports, as needed to accommodate the number of electrical cables that are required to be electrically connected.

The setting boss 12 is dimensioned to receive the connector cable terminal 28 thereon. In a preferred embodiment of the invention, the setting boss 12 protrudes from the surface 32 of the fork crown and is integrally attached to the surface 32. In the embodiment shown in FIGS. 1 through 3, the setting boss is shown as having a circular cross-section corresponding to a bore 34b in the connector cable terminal 28. The connector cable terminal 28 is preferably mounted on the setting boss 12 and secured thereto by a fastening device 36. In a preferred embodiment of the invention, the setting boss is internally threaded to correspond to the external threads on a fastening device 36. The connector cable terminal 28 is fastened to the setting boss 12 by engaging the threads of the fastening device 36 with the internal threads of the setting boss 12 by inserting fastening device 36 through bore 34a. As shown in FIG. 1, in a preferred embodiment of the invention, the fastening device 36 is a setting screw.

The connector cable terminal 28 and the setting boss 12 are shown in FIGS. 1 through 3 as having a circular cross-section. However, the invention is not limited as such and in various embodiments of the invention, the centering boss 12 and the connector cable terminal 28 can have any desired shape.

FIGS. 5 though 8 illustrate an alternative embodiment of the present invention wherein a fork crown cover 100 is placed over the bicycle fork crown 10, and the setting boss 112 and connector holder 114 are attached to the fork crown cover 100, rather than the fork crown 10. The structure and electrical connections of the setting boss 112 and the connector holder 114 are substantially similar to those described in the embodiment of FIGS. 1 through 4. Specifically, the connector holder 114 has an inlet 118 for receiving an electrical cable 116a and an outlet 120. The inlet 118 of the connector holder 114 is preferably dimensioned to securely receive electrical cables.

An electrical connector 122 is used to electrically connect cable 116a with another cable 116b. The electrical connector 122 preferably has a first end 124 attachable to the outlet 120 of the connector holder 114 and a second end 126 dimensioned to receive electrical cable 116b. Connector 122 provides an electrical connection for cable 116a and 116b.

As best shown in FIGS. 5 and 7, cable 116b is electrically connected to cables 116c and 116d via a connector cable terminal 128. Cable terminal 128 has various electrical ports 130 dimensioned to receive the electrical cables 116b, 116c, and 116d. In the embodiments shown in FIGS. 5 through 7, the cable terminal 128 has three ports 130 dimensioned to receive the three cables 116b, 116c, and 116d. In other embodiments of the invention, the connector cable terminal 128 can have any number of ports, as needed to receive and connect electrical cables.

As best shown in FIGS. 5 and 7, the setting boss 112 is dimensioned to receive the connector cable terminal 128 thereon. In a preferred embodiment of the invention, the setting boss 112 protrudes from the surface 132 of the fork crown cover 100 and is integrally attached to the surface 132. In the embodiment shown in FIGS. 5 through 7, the setting boss 112 is shown as having a circular cross-section corresponding to a bore 134 in the connector cable terminal 128. The connector cable terminal 128 is preferably mounted on the setting boss 112 and secured thereto by a fastening device 136. In a preferred embodiment of the present invention, the setting boss 112 is internally threaded to correspond to the external threads on the fastening device 136. The connector cable terminal 128 is preferably fastened to the setting boss 112 by engaging the threads of the fastening device 136 with the internal threads of the setting boss 112.

In another embodiment of the invention, as shown in FIG. 9, the fork crown cover 100 has a channel 138 defined therein for accessing the pre-load adjuster (not shown). By accessing the pre-load adjuster, the suspension system can be altered to account for the rider's weight. For example, for a light-weight rider, the spring of the suspension system can be adjusted for less pre-load. For a heavy-weight rider the spring of the suspension system can be adjusted to provide more pre-load. The channel 138 in the fork crown cover 100 allows easy access to the rider or dealer to adjust the pre-load of the spring. To prevent dirt, fluids and other elements from damaging the pre-load adjustment mechanism, a cap 140 is provided to cover the access channel 138 when the pre-load adjustment mechanism is being used. The cap 140 is preferably dimensioned to cover the access to channel 138 and preferably includes a notch 142 therein to facilitate the removal of the cap 140 from the crown cover 100 when access to the channel 138 is desired.

Figure 11:
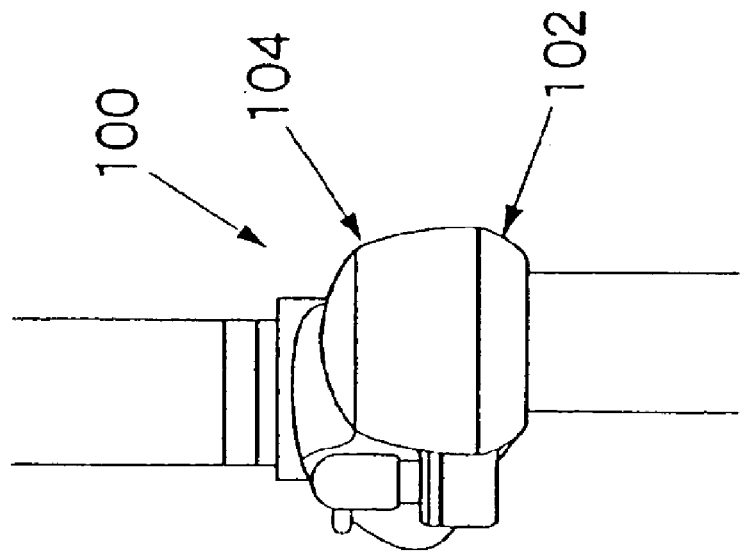
FIG. 11 is a side view of the embodiment of the fork crown cover of the present invention shown in FIG. 10.
Figure 10:
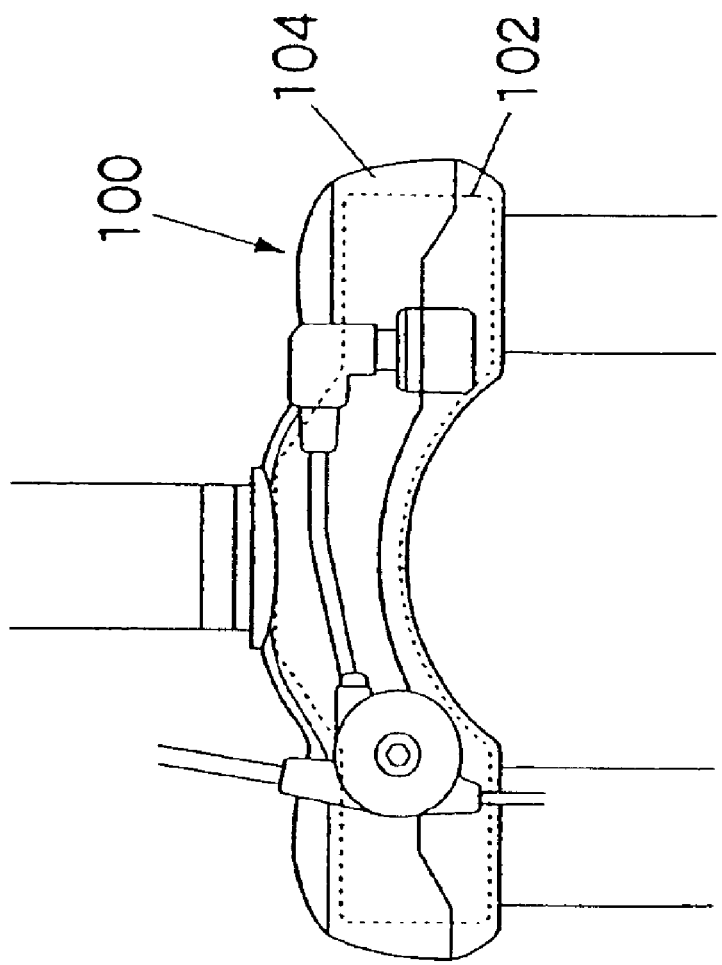
FIG. 10 is front view of an embodiment of the fork crown cover of the present invention having a fork crown lower cover and a fork crown upper cover.

In another embodiment of the present invention, as shown in FIGS. 10 and 11, the fork crown cover 100 includes a fork crown lower cover 102 and a fork crown upper cover 104. The upper cover 104 preferably includes the setting boss 112 and connector holder 114. In an alternative embodiment, the crown cover 100 can include only the upper cover 104, leaving the fork crown 10 exposed to the environment from below. By providing a lower cover 102, in addition to the upper cover 104, the fork crown 10 is better protected from rain, dust, dirt and other elements that could cause damage to the fork crown 10 or the suspension system generally.

The lower cover 102 can be fastened to the fork crown 10 or to the upper crown 104 by any known fastening means. In a preferred embodiment of the invention, as shown in FIG. 12, the lower cover 102 is fastened to the fork crown 10 using setting screws 106. Other known fastening devices can be used in place of setting screws 106.

Figure 14:
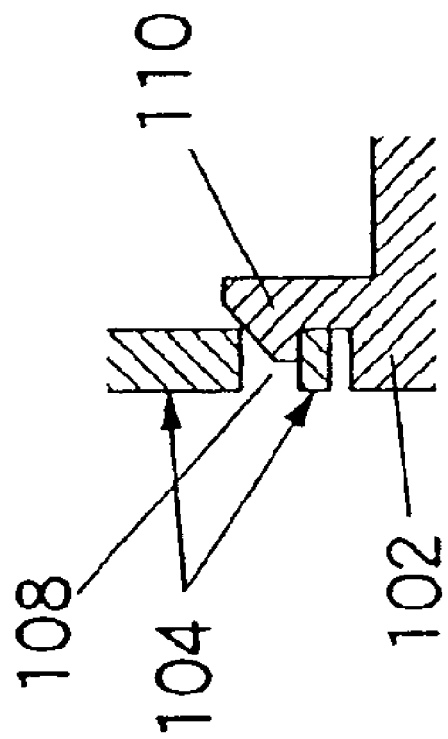
FIG. 14 is a side cross-sectional view of the embodiment of the fork crown cover of the present invention shown in FIG. 13.
Figure 13:
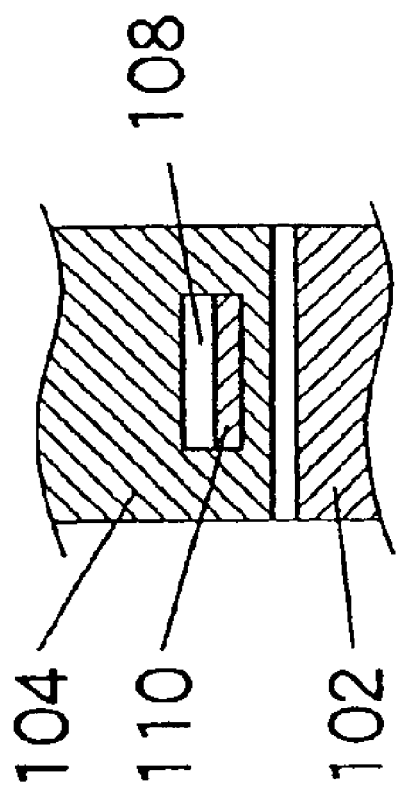
FIG. 13 is a partial view of an embodiment of the fork crown cover of the present invention wherein the upper and lower covers are connected by flexible setting posts.

In another preferred embodiment of the invention, as shown in FIGS. 13 and 14, upper cover 104 includes a setting aperture 108 and the lower cover includes a flexible setting post 110 dimensioned to engage with the setting aperture 108. The flexible setting post preferably has a latch portion 111 that protrudes into the setting aperture 108 when the setting post 110 is engaged with the setting aperture 108. The latch portion 111 securely fastens the upper cover 104 to the lower cover 102 when the post 110 is engaged with the aperture 108.

In another preferred embodiment of the invention, as shown in FIGS. 15 and 16, a cover 150 made of a soft material is used to cover the fork crown 10, generally, and the connector holder 14, specifically. The cover 150 is preferably made of an electrically insulative material and more preferably is made of rubber. Some of the benefits of the rubber cover 150 are that it is flexible, allowing for easy fitting over the fork crown, and inexpensive. Additionally, if using a rubber cover 150, the electrical connections can be bare code with rough connection. By having bare code with rough connection, the need for an electrical connector 22 and a connector cable terminal 28 is eliminated, as shown in FIG. 17, further reducing the assembly cost of the electrical connections.

What is claimed is:

1. A method of connecting electrical cables comprising the steps of:

providing a bicycle fork crown having a connector holder and an electrical connector, wherein the connector holder and electrical connector each have at least two portals;

electrically and mechanically connecting a cable to one of the portals in the electrical connector;

electrically and mechanically connecting a cable to one of the portals in the connector holder;

electrically and mechanically connecting the electrical connector to one of the portals of the connector holder;

providing a setting boss and a connector cable terminal on the fork crown, wherein the setting boss is dimensioned to receive the connector cable terminal thereon;

electrically and mechanically connecting a cable to the connector cable terminal; and installing the connector cable terminal onto the setting boss.

2. A method of connecting electrical cables, comprising the steps of:

providing a bicycle crown cover having a connector holder and an electrical connector, wherein the connector holder and electrical connector each have at least two portals;

electrically and mechanically connecting a cable to one of the portals in the electrical connector;

electrically and mechanically connecting a cable to one of the portals in the connector holder;

electrically and mechanically connecting the electrical connector to one of the portals of the connector holder;

providing a setting boss and a connector cable terminal on the fork crown cover, wherein the setting boss is dimensioned to receive the connector cable terminal thereon;

electrically and mechanically connecting a cable to the connector cable terminal; and installing the connector cable terminal onto the setting boss.

* * * * *